United States Patent [19]

Andris

[11] Patent Number: 5,205,441
[45] Date of Patent: Apr. 27, 1993

[54] SUCTION AND/OR DISCHARGE VALVE FOR A METERING AND SPRAY PUMP FOR DISPENSING LIQUID, LOW-VISCOSITY AND PASTY SUBSTANCES

[75] Inventor: Raimund Andris, Villingen-Schwenningen, Fed. Rep. of Germany

[73] Assignee: Firma Raimund Andris GmbH & Co. KG., Villingen-Schwenningen, Fed. Rep. of Germany

[21] Appl. No.: 810,843

[22] Filed: Dec. 20, 1991

[30] Foreign Application Priority Data

Dec. 21, 1990 [DE] Fed. Rep. of Germany ....... 4041135

[51] Int. Cl.⁵ .................. B65D 37/00; F16K 15/14; F04B 21/04
[52] U.S. Cl. .................. 222/207; 137/859; 417/550
[58] Field of Search .............. 417/545, 550; 222/207, 222/321, 383; 137/859, 852

[56] References Cited

U.S. PATENT DOCUMENTS

| | | | |
|---|---|---|---|
| 4,475,899 | 10/1984 | Muller | 137/859 |
| 4,732,549 | 3/1988 | von Schuckmann | 222/321 |
| 4,863,070 | 9/1989 | Andris | 222/207 |

Primary Examiner—Richard A. Bertsch
Assistant Examiner—Roland McAndrews
Attorney, Agent, or Firm—McGlew and Tuttle

[57] ABSTRACT

Suction and/or discharge valves are provided in a metering and spray pump for liquid or low-viscosity, especially pasty substances, in which two housing parts, which are telescopingly movable relative to one another and are made of a dimensionally stable plastic, have a pump chamber, whose volume can be cyclically altered by a pump member. To provide a valve which can be used both as a suction valve and as a discharge valve and consists of the simplest possible functional parts that can easily be assembled and operate reliably even in the case of relatively wide dimensional tolerances, and which especially has a good quality of closing at low opening force, which can be tested even in the dry state, e.g., on an automatic assembly machine, a valve annular wall 54, which is, with its open edge 55, radially in elastic contact with a conical or hemispherical generated surface 43, is provided with a closed front wall 57 and forms the valve seat, and is connected, elastically movably in the axial direction, to the pump member or to the housing part with which the generated surface 43 is made in one piece.

13 Claims, 4 Drawing Sheets

SUCTION AND/OR DISCHARGE VALVE FOR A METERING AND SPRAY PUMP FOR DISPENSING LIQUID, LOW-VISCOSITY AND PASTY SUBSTANCES

FIELD OF THE INVENTION

The present invention pertains to a suction and/or discharge valve for a metering and spray pump for dispensing liquid or low-viscosity, especially pasty substances from bottle- or can-like containers. In particular the invention relates to a valve with two housing parts made of a dimensionally stable plastic, which are able to move telescopingly relative to one another and have a pump chamber whose volume can be cyclically altered by a pump member. A valve annular wall provided with a closed front wall is in radially elastic contact with a conical or hemispherical generated surface that forms the valve seat and surrounds the generated surface with its open edge. The generated surface is connected, elastically movably in the axial direction, to the housing part which the generated surface is made in one piece with.

BACKGROUND OF THE INVENTION

A wash gel metering pump has been known (West German Utility Model No. DE-GM 75,01,055.8), in which a pump piston, which is mounted in a sealing piston, is provided with a gasket, and can be actuated via an actuating lever, is arranged on one side of a conical valve seat in a pump cylinder. The pump piston can be reset after each pump stroke by means of a coil spring supported on the valve seat. On the other side, an axially movable valve member, which is provided with a closed front wall and has a valve annular wall which is in radially elastic, sealing contact with the conical valve seat, is arranged in a cylindrical cavity of the same cylinder. A helical compression spring, which presses the valve member against the valve seat provided with a central axial bore, is arranged between the valve member and a plug closing the cavity. Aside from the fact that this prior-art metering pump is unsuitable for use as a spray pump, its design is technologically too complicated for a mass-produced article, because it consists of too many individual parts. In addition, the sealing and metering pistons mounted one inside the other require excessive actuating forces.

In another prior-art metering and spray pump (DE 38,28,811 A1), the valve annular wall that is in sealing contact with the cylindrical generated surface of a projection forming the valve seat of the discharge valve is part of a bellows and is elastic only radially, and thus it can also be lifted off only radially. The valve annular walls of the suction valve provided in different embodiments there can also be lifted off from the cylindrical generated surfaces forming their valve seat only in the radial direction during the suction stroke in order for the medium drawn in to be able to flow into the interior of the bellows between the corresponding generated surface and the valve annular wall surrounding it.

Such discharge and suction valves have proved to be unsatisfactory in practice for metering and spray pumps of this class especially because an excessive opening pressure is required in the case of sufficient closing force, on the one hand, and, on the other hand, because the quality of sealing may be compromised by particles that may become lodged between the valve annular wall and the generated surface surrounding it. Given the small size of the parts of such pumps—the diameter of a bellows is ca. 12 to 15 mm and its length is ca. 30 mm—the precision of manufacture is also often insufficient to guarantee the necessary quality of closing of the valves, especially for liquid media. Even small deviations in dimension in the range of one hundredths of one mm may lead to rejects.

The other embodiments of suction valves that can be found in the same document, in which tongue-like or plate-like closing members are provided to cover axial bores, also fail to meet the requirements imposed on such pumps in terms of reliability of operation.

The quality of sealing or closing, especially of the suction valve, is also decisive for the possibility of performing dry function testing, in which these valves must prove to be air-tight, on an automatic assembly machine. Moreover, containers that are equipped with such metering and spray pumps are subjected, for safety's sake, to drop tests, in which the valves also must prove to close reliably in order to pass the test.

Another decisive property which such metering and spray pumps must possess is the possibility of economical manufacture. Since they are manufactured in very large lots, it is necessary for these pumps to consist of the smallest possible number of individual parts with relatively wide dimensional tolerances, and these parts should be able to be assembled in the simplest manner possible.

SUMMARY AND OBJECTS OF THE INVENTION

The object of the present invention is to provide a metering and spray pump of the class described in the introduction having a valve consisting of functional parts that are as simple as possible, are easy to assemble, and operate reliably even in the case of relatively wide dimensional tolerances. This valve has a high reliability of operation, an especially good quality of closing, which can be checked even in the dry state, e.g., on an automatic assembly machine, along with a weak opening force, and can be used both as a suction valve and as a discharge valve.

This task is accomplished according to the present invention by the valve annular wall being connected, via a first group of at least three connection webs distributed in the circumferential direction, to a connection ring that is elastic in both the axial direction and the radial direction. The connection ring being connected, in one piece, via a second group of connection webs, to a mounting ring that is fastened to the pump member or the housing part. In this second group of connection webs there are likewise at least three webs and they are staggered in the circumferential direction in relation to the connection webs of the first group by about half the angular distance of, e.g., 60°.

Due to the simultaneous presence of a radial elasticity and an axial elasticity, two-dimensional contact develops during the closing process of such a valve from an initially linear contact between the valve annular wall and the conical or hemispherical generated surface surrounded by it. Because the edge of the valve annular wall is pushed in the axial direction over the generated surface, particles that may be present between the annular wall and the generated surface can be pushed away. The valve annular wall is also able to adapt itself to the shape of the generated surface easily and in a better sealing manner, even in the oblique position.

Due to these elasticities of the valve annular walls acting in different directions, it is achieved that the closing forces increase approximately double, and the opening forces decrease, approximately by half. This also leads to a considerably wider margin in terms of the necessary precision of manufacture. The valve according to the present invention, which may also be used as a discharge valve providing that certain design conditions are satisfied, guarantees high and reliable quality of closing, i.e., high reliability of operation, even under unfavorable conditions.

Besides these functional advantages, the valve according to the present invention also has the significant advantage that it can be used in pumps which have a bellows as the pump member as well as in pumps in which the pump member consists of a piston that is fastened to one housing part and is axially movable, in a sealingly guided manner, in a cylinder of the other housing part.

The design according to the present invention is the prerequisite for a shape of the most important functional parts. This shape is favorable both from the viewpoint of injection molding technology and functionally in every respect. This makes the desired properties of the valve extensively independent of the properties of the medium to be pumped. In addition, an advantageous, high elasticity and flexibility of function are also guaranteed by the selected connection members.

In one embodiment of the invention, the bellows, the second group of connection webs, the connection ring and the first group of connection webs can all be made in one piece with one of the housing parts. Due to this one piece design, special assembly operations for the suction valve become unnecessary, and no separate injection molding die is required for its manufacture.

Another embodiment according to the invention is where the valve annular wall, the first group of connection webs, the connection ring and the second group of connection webs are all formed in one piece with a mounting ring. The mounting ring can then be inserted in a seat on one of the housing parts. This is advantageous for pumps whose pump member is formed by a piston and for certain other applications, especially when a material different from that of the valve annular wall is to be used for, e.g., the bellows, and/or when the valve according to the present invention is to be used as a discharge valve in the piston.

Other embodiments facilitate efficient manufacture and correct closing function of the suction valve.

It should also be borne in mind that the solution according to the present invention permits inexpensive and also compact design.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
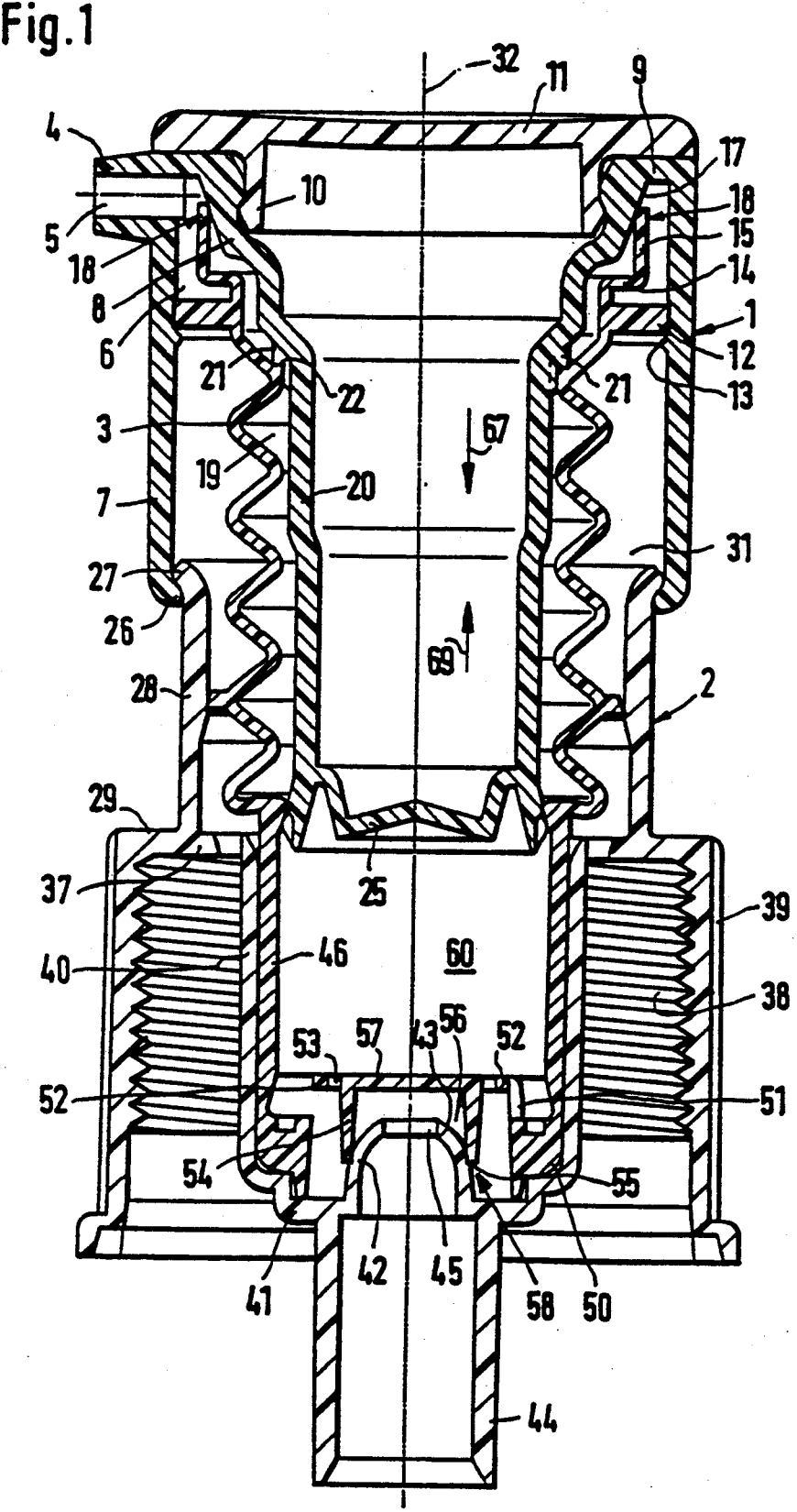
FIG. 1 shows a sectional view of a metering and spray pump in the inoperative position.
Figure 2:
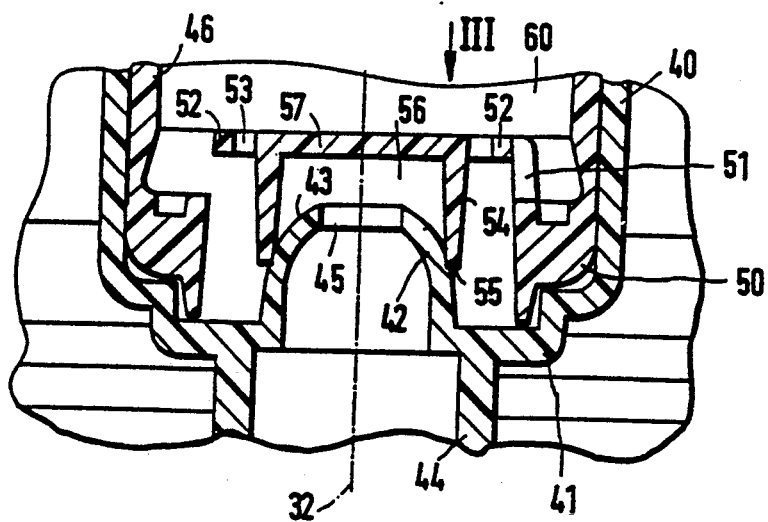
FIG. 2 shows an enlarged sectional representation of the suction valve of the metering and spray pump from FIG. 1.
Figure 3:
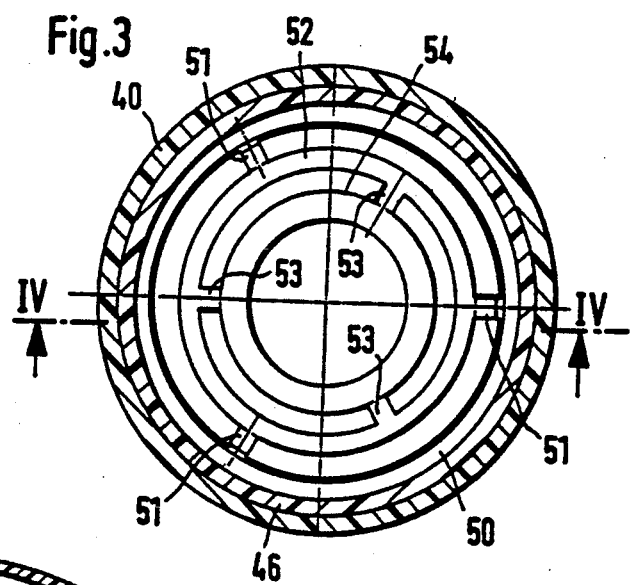
FIG. 3 shows the section III from FIG. 2.
Figure 4:
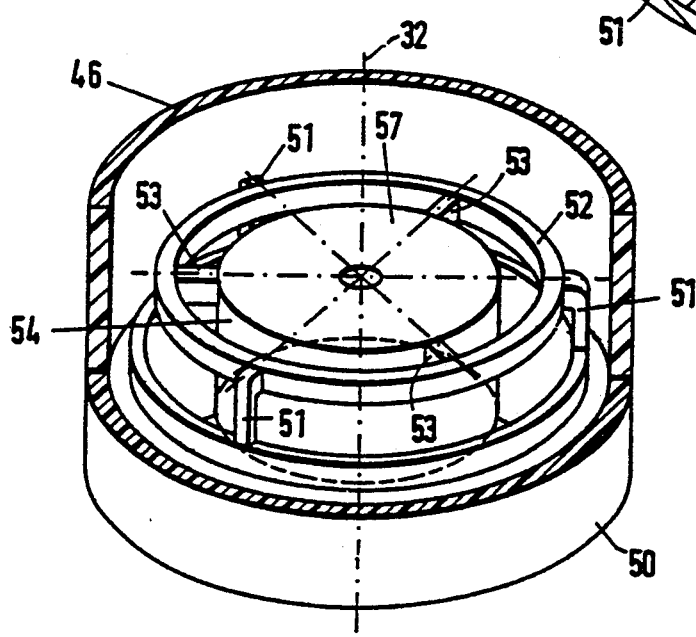
FIG. 4 shows the enlarged, partially cut-away perspective view of the suction valve of the metering and spray pump from FIG. 1.
Figure 6:
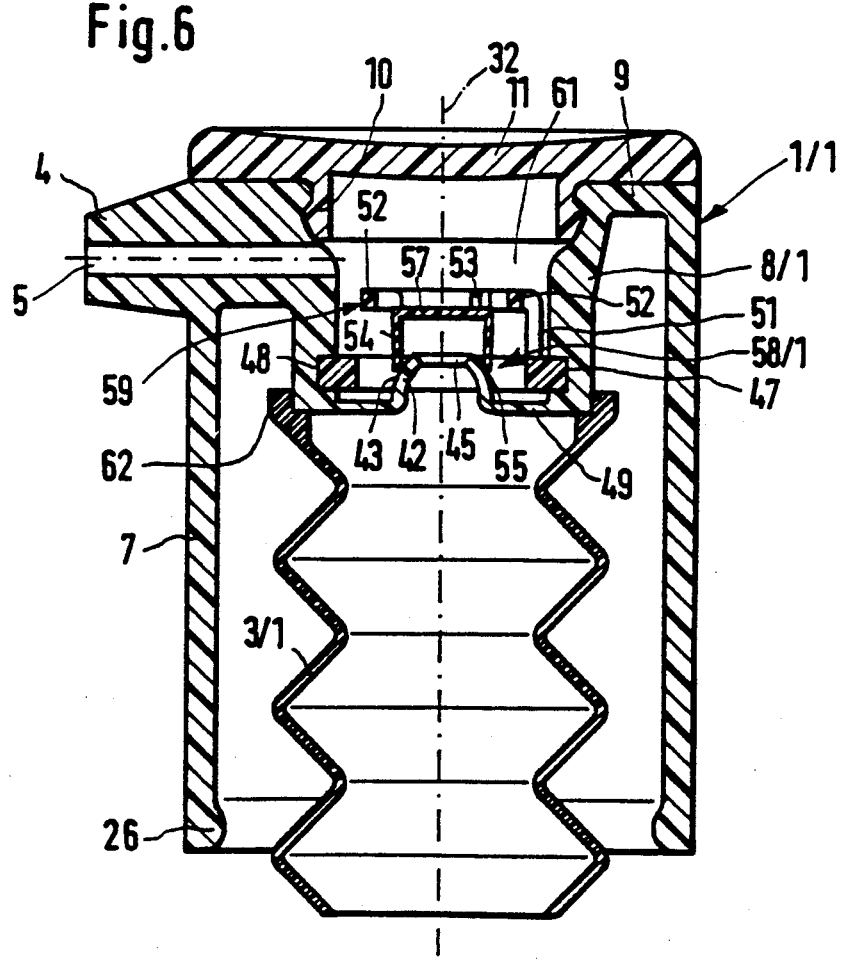
FIG. 6 shows the suction valve according to FIG. 4 as a discharge valve in the head part of another metering and spray pump.
Figure 7:
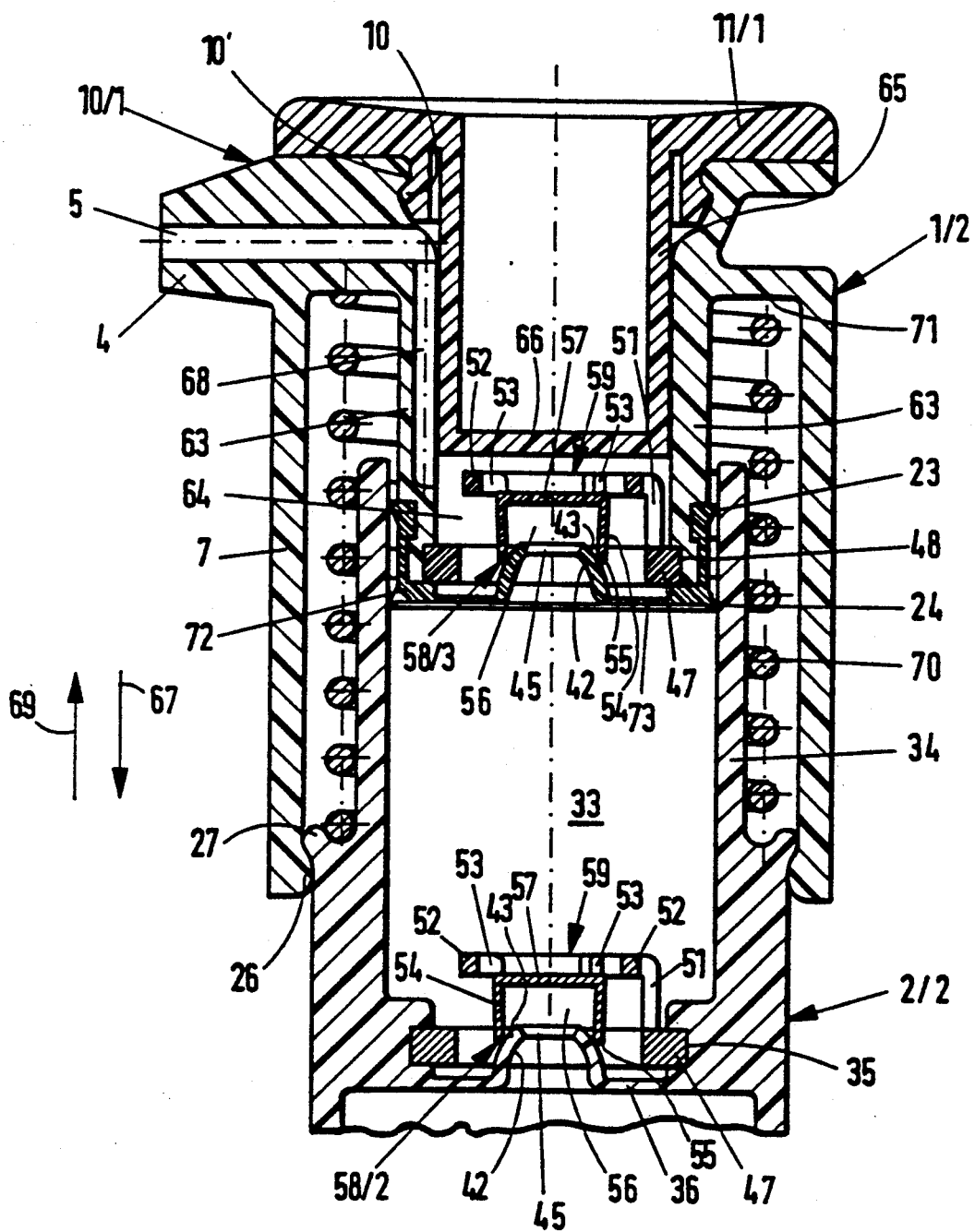
FIG. 7 shows a sectional view of a metering and spray pump with a piston acting as the pump member.

The drawings show three different metering and spray pumps which are used to dispense liquid or low-viscosity, especially pasty substances from bottle- or can-like containers. FIGS. 1, 6 and 7 show the pumps in their respective usual positions of use or handling positions.

The metering and spray pump according to FIG. 1 consists of a first upper housing part 1 and a second lower housing part 2, wherein "upper" and "lower" in the drawing also correspond to the normal handling position, as well as a bellows 3 arranged as a connection between the two housing parts 1 and 2.

While the two housing parts 1 and 2 are each made of a dimensionally stable plastic, the bellows 3 consists of a rubber-like elastic plastic, whose elasticity is able to ensure both sufficient dimensional stability and sufficiently high restoring force for the initial strokes.

Both the bellows 3 and the two housing parts 1 and 2 are made in one piece according to the injection molding process.

The housing part 1 provided with a laterally radially projecting, tubular discharge nozzle 4, whose discharge canal 5 opens into an annular chamber 6 that is arranged between an outer, cylindrical guide wall 7 and an inner annular wall 8 tapering conically in the downward direction. The annular chamber 6 is closed in the upward direction by a front wall 9 connecting the guide wall 7 and the inner annular wall 8. A closing cap 11, which is provided with a snap-in projection 10 and closes the top end of the inner annular wall 8, is placed on the front wall 9 by means of a snap-in connection.

The bellows 3 is provided, at the end of its topmost annular fold, with an external sealing ring 12 that is in sealing contact, with the inner surface of the guide wall 7 immediately above an inner thin circumferential rib 13 provided on the guide wall 7. An axially elastic annular shoulder 14 is arranged above the outer sealing ring 12 and connected to the bellows 3. An essentially cylindrical and radially elastic valve annular wall 15 is connected, in one piece via the annular shoulder 14, to the bellows 3 or to the sealing ring 12. The valve annular wall 15 has an upper end edge 16, in sealing contact with the conical generated surface 17 of the inner annular wall 8. The annular wall 15 is under a certain axially as well as radially acting pre-tension, and forms, in cooperation with the inner annular wall 8, the movable closing member of a discharge valve 18, on the one hand, and the partition between the annular chamber 6 and the interior space 19 of the bellows 3, on the other hand.

The interior space 19 of the bellows 3 is largely filled with a hollow cylindrical displacement body 20 with a multiply stepped diameter, which is made in one piece, as an extension, with the inner annular wall 8 of the housing part 1. The displacement body 20 has a closed lower front wall 25 and is located, all around and over its entire length, at a radially spaced location from the wall of the bellows 3. The medium to be discharged is able to flow between the displacement body 20 and the wall of the bellows 3.

The guide wall 7 of the housing part 1 is provided at its lower end with an inwardly projecting collar 26, which extends in a positive-locking manner below an outwardly projecting collar 27 of a guide wall 28 of the housing part 2. The two guide walls 7 and 28 are guided telescopingly one inside the other and permit a telescoping axial movement relative to one another, which corresponds to one pump stroke. This axial relative movement is limited by axial stops which are formed by two collars 26 and 27 in one direction and, in the other direction, by an annular shoulder 29 of the housing 2. The collar 26 of the housing part 1 strikes the annular shoulder 29 at the end of the pump stroke.

The diameters of the collars 26 and 27 and the diameters of the guide walls 7 and 28 are coordinated so that sufficient guiding is guaranteed between the two housing parts 1 and 2, on the one hand, but sufficient exchange of air between the surroundings and the common housing interior space 31 is able to take place during the stroke movements, on the other hand.

Like all other components except for the discharge nozzle 4, the guide wall 28 is made in one piece with ring land 37 of the housing part 2 concentrically with the common axis 32. On its axial opposite side, a screw cap 39 is provided with internal threads 38, by means of which the entire metering and spray pump can be screwed onto the threaded neck (not shown) of a can- or bottle-like paste or liquid container. The screw cap 39, is provided in one piece with the treads 38.

In addition, a pot-shaped body 40, whose front-side bottom wall 41 has a central hollow body 42 directed upward in the form of a nipple. The central hollow body 42 has a passage bore 45, a hemispherical generated surface 43 acting as a valve seat, and a downwardly directed suction connection piece 44. The central hollow body and all its parts are made concentrically in one piece with the ring land 37 in the interior of the screw cap 39. The intake connection piece may be provided with a suction tube (not shown) for drawing up a liquid medium.

A cylinder wall 46 connected in one piece to the bellows 3 is seated in the pot-shaped body 40 with a clearance-free fit.

The above-described shaping, which causes no additional costs, also ensures a radially highly compact design.

The cylinder wall 46 of the bellows 3 has a reinforced front edge 50, which is seated on the bottom wall 41 of the pot-shaped body 40, and is made in one piece with a first group of three axially upwardly directed, finger-like connection webs 51 distributed in the circumferential direction at a spacing of 120°. The upper ends of the connection webs 51 are made in one piece with a connection ring 52, which is elastic both radially and axially. The connection ring 52 is in turn connected, by a second group of connection webs 53 that extend essentially radially and are staggered by 60° relative to the connection webs 51. The webs 53 connect the connection ring 52 to a cylindrical valve annular wall 54 which is provided at its top end with a front closing wall 57 that closes off its cavity 56. The valve annular wall 54 is of a thin-walled design, and it sits with a lower, open peripheral edge 55 on the hemispherical generated surface 43 of the hollow body 42 in a radially elastic and sealing manner. The internal diameter of the valve annular wall 54 is about double the diameter of the passage bore 45, but only slightly smaller than the external diameter of the hollow body 42.

Due to the simultaneous radial and axial elasticity of the connecting ring 52, the valve annular wall 54 is always able to lie sealingly on the generated surface 43 even in the case of inaccurate manufacture or oblique position, even if the generated surface 43 were conical rather than hemispherical.

This elasticity or spring quality of the connection ring 52 also ensures that the valve annular wall 54 will completely return into its closed position on completion of the suction stroke. The generated surface 43 of the hollow body 42 and the valve annular wall 54 thus form the suction valve 58 of the metering and spray pump.

Figure 5:
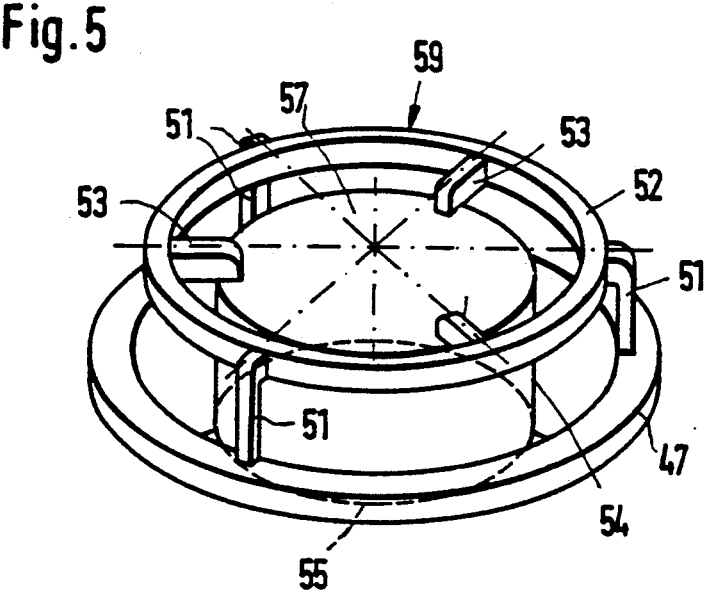
FIG. 5 shows a representation analogous to FIG. 4 of a suction valve as a separate, individual part.

While the valve annular wall 54, the connection webs 51 and 53, and the connection ring 52 are made in one piece with and on the lower front edge 50 of the bellows 3 in the above-described, preferred embodiment, FIG. 5 shows a valve member 59 with a valve annular wall 54 in which the outer connection webs 51 are made in one piece with and on another, preferably more stable mounting ring 47 which can be inserted into a corresponding seat of the front edge 50 or of the pot-shaped body 40. The valve annular wall 54 is thus manufactured, together with the connection webs 51 and 53, the connection ring 52 and the additional mounting ring 47, as a separate component or valve member 59, which can be optionally inserted into a metering and spray pump as a suction valve 58 or, as shown in FIG. 6, as a discharge valve 58/1.

In the embodiment of the valve member 59 shown in FIGS. 5 and 6, the three radial connection webs 53 are made in one piece with and on the edge of the upper front side of the valve annular wall 54. There is no functional difference from the embodiment according to FIGS. 1 through 4.

FIG. 6 shows, as a first variant of the embodiment according to FIG. 1, a first, upper housing part 1/1, into which the valve member 59, which is represented as an individual component in FIG. 5 and consists of the valve annular wall 54, the three radial connection webs 53, the connection ring 52, the axial connection webs 51, and the mounting ring 47, is inserted, in cooperation with a hemispherical hollow body 42 acting as a discharge valve. The housing part 1/1 differs from the housing part 1 only in that instead of the conical annular wall 8 and the displacement body 20, it has a hollow, approximately cylindrical annular wall 8/1 with a lower front wall 49 and the hemispherical hollow body 42. Annular wall 8/1, lower front wall 49 and hollow body 42 are all made in one piece. Immediately above the front wall 49, the mounting ring 47 of the valve member 59 is inserted into an inner annular groove 48 in a positive-locking manner, so that the lower peripheral edge 55 of the valve annular wall 54 is in elastic and at the same time sealing contact with the generated surface 43 of the hollow body 42. This forms the discharge valve 58/1. The approximately cylindrical cavity 61, which is closed by the closing cap 11 in the upward direction, is in direct contact with the discharge canal 5.

The top end of the bellows 3/1 is also designed differently than in the bellows 3. The bellows 3/1 is fastened, firmly seated, at the lower edge of the annular wall 8/1 only by means of a folded ring 62. The metering and spray pump equipped with such a first housing part 1/1 may otherwise have the same or similar design as that shown in FIG. 1.

The elasticity of the material of the bellows 3 in FIG. 1 also brings about automatic return of the first housing part 1 into its extended starting position as soon as axial force ceases to be exerted on it, i.e., when it is released after a discharge stroke that took place in the direction of arrow 67. This return movement in the direction of arrow 69 is the suction stroke, during which the valve annular wall 54 is axially elastically lifted off from the generated surface 43 in order for medium to be able to flow from the container into the interior space 60 of the cylinder wall 46 and the annular folds of the bellows 3.

Since the valve annular wall 54 is made in one piece with the connection ring 52 that is elastic in the axial direction, it is also able to perform axial movements relative to the generated surface 43 of the hollow body 42, so that the opening and closing processes can take place more easily and rapidly.

Due to the circumferentially mutually staggered arrangement of the two groups of connection webs 51 and 53 and the spring elasticity of the connection ring 52, one achieves the functionally important property that the lower peripheral edge 55 of the valve annular wall 54 will always be able to be in optimal contact with the hemispherical generated surface 43 of the hollow body 42.

FIG. 7 shows a second variant of the embodiment according to FIG. 1, in which—instead of a bellows—a piston 72 acting as a pump member is guided axially movably in a cylinder 34 of a second, lower housing part 2/2. The cylinder 34 forms a pump chamber 33 and is provided with sealing ring lips 23, 24. In the lower part of the pump chamber 33, the valve member 59 according to FIG. 5, with its mounting ring 47, is inserted into and fixed in an annular groove 35 of the housing part 2/2. The annular groove 35 is arranged at a small distance above a front wall 36. The hollow body 42 with its central passage bore 45 and its hemispherical generated surface 43 is made in one piece with this front wall 36 of the housing 2/2, analogously to the embodiment according to FIG. 1, wherein the hollow body 42 forms the suction valve 58/2 in cooperation with the valve annular wall 54 of the valve member 59.

The piston 72 is fixed, firmly seated, at the lower end of an inner cylinder wall 63 of the first, upper housing part 1/2. The upper housing part forms a shaping unit with the outer guide wall 7 as well as with the discharge nozzle 4 and the discharge canal 5. The largest part of the cavity 64 of the cylinder wall 63 is filled by a fittingly inserted hollow cylinder 65 with closed lower front wall 66. Through an axial groove 68 in the inner surface of the cylinder wall 63, the cavity 64 communicates with the discharge canal 5.

The hollow cylinder 65 is part of a closing cap 11/1, which is lockingly inserted in an upper expansion of the housing part 10/1 by means of a snap-on projection 10.

The mounting ring 47 of the valve member 59 is inserted, in this case as well, into an annular groove 48 of the first upper housing part 1/2, so that the valve annular wall 54 forms the discharge valve 58/3 in cooperation with the hemispherical generated surface 43 of the hollow body 42.

In order for the housing part 1/2 to automatically return into its starting position after a discharge stroke that took place in the direction of arrow 69, a compression spring 70, which is supported on a collar 27 of the housing part 2/2, on the one hand, and on the inner annular shoulder 71 of the housing part 1/2, is arranged between the two housing parts 1/2 and 2/2 concentrically with the cylinder 34.

In this embodiment according to FIG. 7, the valve according to the present invention serves, in a totally identical design, once as a suction valve 58/2 and once as a discharge valve 58/3. The mode of operation is the same in all cases. During each discharge stroke of the housing part 1/2 relative to the nonmoving housing part 2/2 in the direction of arrow 67, medium is delivered by the increased pressure from the pump chamber 33 through the discharge valve 58/3 and into the discharge canal 5. The lower suction valve 58/2 is now tightly closed. During the subsequent suction stroke taking place in the direction of arrow 69, medium is drawn through the suction valve 58/2 from the container (not shown) provided with this metering and spray pump into the pump chamber 33, while the discharge valve 58/3 is closed, after which a new pump cycle can take place.

The embodiment according to the present invention provides a valve design for metering and spray pumps for liquid and low-viscosity or pasty substances which guarantees trouble-free pump function and can be used both as a suction valve and as a discharge valve. The valve annular wall 54, functioning trouble-free, can be manufactured as the essential functional element, optionally as an individual component or as a one-piece part of a bellows 3. Due to the improved pump function, the valve according to the present invention may be used in metering and spray pumps universally for both liquid and pasty media.

The initial drawing in of medium from a container takes place with certainty after only a few pump strokes, and dry function testing, especially on an automatic assembly machine during the manufacturing process, is possible, which leads to substantially fewer customer complaints and reduced costs caused by rejects.

While specific embodiments of the invention have been shown and described in detail to illustrate the application of the principles of the invention, it will be understood that the invention may be embodied otherwise without departing from such principles.

What is claimed is:

1. A dispensing pump comprising:
   pump means for changing a volume of pump chamber;
   a valve seat connected to said pump chamber, said valve seat having one of a substantially conical or substantially hemispherical shape, and said valve seat defining a passage bore;
   a valve annular wall movable into and out of contact with said valve seat, said valve annular wall having an open edge means for forming a seal between said valve annular wall and said valve seat when said valve annular wall is in contact with said valve seat, said valve annular wall has a closing wall closing one end of said valve annular wall;
   a first connection web means for supporting said valve annular wall movable in an axial and radial direction;
   a connection ring connected by said first connection web means to said valve annular wall;
   a second connection web means for connecting said connection ring to said pump means and for supporting said connection ring and said valve annular wall movable in said axial and radial direction, said second connection web means and said first connection web means forming to move said valve annular wall into contact with said valve seat when said pressure against said valve annular wall is greater than a pressure of said passage bore, said first connection web means and said second web means deforming to moving said valve annular wall away from said valve seat when said pressure against said valve annular wall is less than said pressure of said passage bore.

2. A pump in accordance with claim 1, further comprising:
a mounting ring in between said second connection web means and said pump means, said mounting ring made in one piece with said second connection web means, said connection ring, said first connection web means and said valve annular wall; and
said mounting ring positioned in a mounting seat of said pump means.

3. A pump in accordance with claim 1, wherein:
said connection ring is located in said pump chamber.

4. A pump in accordance with claim 1, wherein:
said passage bore has a diameter approximately half in size of a diameter of said valve annular wall.

5. A in accordance with claim 1, wherein:
said pump means has a piston for said changing of said volume of said pump chamber; and
said valve seat is designed as a nipple-like hollow body and is made in one piece with a wall of said piston, said nipple-like hollow body extends out of said pump chamber and against said valve annular wall.

6. A pump in accordance with claim 5, wherein:
said open edge means has an internal diameter slightly smaller than an external diameter of said nipple-like hollow body.

7. A pump in accordance with claim 1, wherein:
said pump means has a first housing and a second housing telescopically movable relative to each other and said first housing and said second housing are made of plastic;
said first connection web means has three webs distributed in a circumferential direction; and
said second connection web means has three webs distributed in a circumferential direction and located in a staggered position relative to said three webs of said first connection web means.

8. A pump in accordance with claim 7, wherein:
said second housing has a bellows extending towards said first housing and said valve annular wall is connected to said second housing by said first connection web means, said connection ring and said second connection web means; and
said bellows, said second housing, said second connection web means, said connection ring, said first connection web means and said valve annular wall are all being made in one piece.

9. A pump in accordance with claim 7, wherein:
said valve seat is designed as a nipple-like hollow body and is made in one piece with one of said first housing and said second housing, and said nipple-like hollow body extends into said pump chamber.

10. A pump in accordance with claim 6, wherein:
said open edge means has an internal diameter slightly smaller than an external diameter of said nipple-like hollow body.

11. A valve comprising:
a valve seat including one of a substantially conical or substantially hemispherical shape, and said one of said substantially conical or substantially hemispherical shape defining a passage bore;
a valve annular wall movable into and out of contact with said valve seat, said valve annular wall having an open edge means for forming a seal between said valve annular wall and said valve seat when said valve annular wall is in contact with said valve seat, said valve annular wall including a closing wall closing one end of said valve annular wall, said valve annular wall and said closing wall including an inside surface adjacent said valve seat, said valve annular wall and said closing wall also including an outside surface substantially opposite said inside surface;
a first connection web means for supporting said valve annular wall movable in an axial direction;
a connection ring connected by said first connection web means to said valve annular wall;
a second connection web means for connecting said connection ring to a mounting ring surrounding said valve seat, said second connection web means being for supporting said connection ring and said valve annular wall movable in a radial direction, said second connection web means and said first connection web means forming to move said valve annular wall into contact with said valve seat when pressure against said outside surface is greater than a pressure against said inside surface, said first connection web means and said second web means deforming to moving said valve annular wall away from said valve seat when said pressure against said outside surface is less than said pressure against said inside surface.

12. A valve comprising:
a valve seat including one of a substantially conical or substantially hemispherical shape, and said one of said substantially conical or substantially hemispherical shape defining a passage bore;
a valve annular wall movable into and out of contact with said valve seat, said valve annular wall having an open edge means for forming a seal between said valve annular wall and said valve seat when said valve annular wall is in contact with said valve seat, said valve annular wall including a closing wall closing one end of said valve annular wall, said valve annular wall and said closing wall including an inside surface adjacent said valve seat, said valve annular wall and said closing wall also including an outside surface substantially opposite said inside surface;
movement means for moving said valve annular wall in an axial and radial direction, said movement means including a first connection web connected to said annular wall, a connection ring connected by said first connection web to said valve annular wall, a second connection web connected to said connection ring and to a mounting ring surrounding said valve seat, said second connection web, said connection ring and said first connection web forming to move said valve annular wall into contact with said valve when pressure against said outside surface is greater than a pressure against said inside surface, said first connection web, said connection ring and said second web means moving said valve annular wall away from said valve seat when said pressure against said outside surface is less than said pressure against said inside surface.

13. A valve in accordance with claim 12, wherein:
said connection ring deforms to move said valve annular wall away from said valve seat.

* * * * *